United States Patent
Bernauer et al.

(10) Patent No.: US 6,380,646 B1
(45) Date of Patent: Apr. 30, 2002

(54) MOTOR WITH AN ELECTRICALLY COMMUTATED STATOR AND A ROTOR WITH PERMANENT MAGNETS

(75) Inventors: Christof Bernauer, Forbach; Matthias Henschel, Rheinmuenster, both of (DE)

(73) Assignee: Ronald Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,789

(22) PCT Filed: Sep. 23, 1999

(86) PCT No.: PCT/DE99/03049

§ 371 Date: Sep. 11, 2000

§ 102(e) Date: Sep. 11, 2000

(87) PCT Pub. No.: WO00/36727

PCT Pub. Date: Jun. 22, 2000

(30) Foreign Application Priority Data

Dec. 11, 1998 (DE) .......................................... 198 57 180

(51) Int. Cl.[7] .............................................. H02K 37/00
(52) U.S. Cl. ...................................... 310/49 R; 310/254
(58) Field of Search .......................... 310/49 R, 156.26, 310/156.64, 254, 156.12, 156.55, 156.45, 156.01; 29/596, 598

(56) References Cited

U.S. PATENT DOCUMENTS

| | | | |
|---|---|---|---|
| 3,601,640 A | * 8/1971 | Egawa | 310/49 R |
| 3,604,961 A | 9/1971 | Saldinger | 310/51 |
| 4,216,400 A | * 8/1980 | Lynch et al. | 310/154 |
| 4,424,463 A | * 1/1984 | Musil | 310/49 R |
| 4,644,233 A | * 2/1987 | Suzuki | 310/254 |
| 4,769,567 A | * 9/1988 | Kurauchi et al. | 310/156 |
| 4,933,584 A | * 6/1990 | Harms et al. | 310/162 |
| 4,998,032 A | * 3/1991 | Burgbacher | 310/51 |
| 5,095,238 A | * 3/1992 | Suzuki et al. | 310/156 |
| 5,128,570 A | * 7/1992 | Isozaki | 310/49 R |
| 5,386,161 A | * 1/1995 | Sakamoto | 310/49 R |
| 5,708,310 A | * 1/1998 | Sakamoto et al. | 310/49 R |
| 5,773,908 A | * 6/1998 | Stephens et al. | 310/254 |
| 5,861,696 A | * 1/1999 | Hartman et al. | 310/156 |

\* cited by examiner

*Primary Examiner*—Joseph Waks
(74) *Attorney, Agent, or Firm*—Ronald E. Greigg

(57) ABSTRACT

A low-noise, torque compensated motor with an electrically commutated stator and a permanent magnet rotor which is achieved solely through a spacing of the air gap surfaces of the stator if these surfaces are at least partially provided with fine gearing teeth and pole pairs are formed in which at least part of the fine gearing teeth are respectively offset in relation to one another.

20 Claims, 3 Drawing Sheets

A similar motor has been disclosed by U.S. Pat. No. 3,604,961. In this instance, the electrically excited rotor, which is embodied as an internal rotor, has a uniform, meander-shaped fine gearing teeth on its circumference so that it is designed to be radially symmetrical in this direction. The poles of the stator are embodied as permanent magnets, but are not disposed uniformly in the circumference direction since they alternatingly assume an angle of less than and greater than 360°/ç, wherein ç represents the number of poles. The deviation angle is then selected so that a more uniform magnetic field distribution is produced in the circumference direction between the rotor and the stator. This leads to the reduction of the torque between the rotor and stator. Without this offset of the permanent magnets, the numbers of poles would cause a number of non symetrical to be produced between the rotor and stator, which could be detected when manually spinning the rotor and could result in an unsteady and noise-encumbered operation of the motor.

MOTOR WITH AN ELECTRICALLY COMMUTATED STATOR AND A ROTOR WITH PERMANENT MAGNETS

PRIOR ART

The invention relates to a motor that has a stator with different magnet poles and has a rotor with a matched number of permanent magnet poles, in which the air gap surfaces in the region between the stator and rotor are provided with fine gearings in order to reduce the torque between them.

This known reduction of the torque, however, requires a complex design of the stator which depends on the precise installation of the permanent magnets. Furthermore, this design of the motor more or less limits the reduction of the torque.

An object of the invention is to produce a motor with compensation of the torque, which is simple in design and operationally reliable and which offers a significantly improved potential for reduction and compensation of the torque.

The offsetting of the fine gearing teeth in the vicinity of the air gap surfaces of the stator produces a symmetrically designed permanent magnet rotor which is simple to manufacture and produces definite magnetic field ratios in the circumference direction that can be influenced in a number of ways via the fine gearing teeth disposed on the stator. In this connection, the stator can still be designed as essentially symmetrical. The compensation of the torque remains limited to the design of the fine gearing, teeth which can be produced together with the formation of the magnet poles by means of a simple stamping of a "solid armature". Therefore other improvements of the torque compensation can also be easily incorporated into the manufacturing process of the motor since only the stamping procedure needs to be correspondingly modified. Moreover, a power supply by means of sliding contacts is no longer necessary since this can take place by means of a simple electronic control circuit.

A particularly simple design of the motor is produced by virtue of the fact that the number of magnet poles of the stator corresponds to the number of permanent magnet poles of the rotor, wherein the provision is made in particular that the stator is embodied as an internal stator and the rotor is embodied as an external rotor.

According to one embodiment, the effective compensation of the torque is produced by the fact that the offset of the fine gearing of the pole pairs identically and preferably corresponds to half a spacing of the fine gearing teeth.

With regard to the design of the rotor, according to one embodiment, the provision can be made that the permanent magnet poles of the rotor are constituted by means of individual permanent magnets that are distributed uniformly over the circumference of the rotor and that have a polarity that alternates in the circumference direction, wherein the individual permanent magnets can also be magnetized in a single-pole fashion.

Another embodiment for the rotor can be produced by the fact that the permanent magnet poles of the rotor are constituted by a number of two-pole annular segment permanent magnets distributed uniformly over the circumference of the rotor, which are disposed with their poles in the same direction toward the circumference, wherein the permanent magnet poles can also be constituted by multi-pole annular segment permanent magnets.

The fine gearings are embodied as meander-shaped in a known fashion, where in the simplest case, the teeth and the tooth spaces of the fine gearing teeth have identical widths and depths.

An extensive compensation of torque is produced by the fact that the teeth and the tooth spaces of the stator have different widths, but have identical depths and are supplementary to each other in the pole pairs, or by virtue of the fact that the widths of the teeth of the one pole and the tooth spaces of the other pole of the pole pairs of the stator change in the same manner, at least in a partial region of the circumference. The number of the teeth and tooth spaces of the stator preferably is an integral multiple of the number of pole pairs formed.

The pole pair formation and the compensation of the torque can be embodied so that the teeth of the pole pairs of the stator, which are constituted by respectively adjacent or diametrically opposed magnet poles, are respectively offset in relation to one another and on the other hand, can be embodied so that the teeth of pole pairs of the stator, which are constituted by magnet poles respectively offset by two pole spacings, are respectively offset from one another. In both instances, the teeth of the pole pairs are offset in antiphase in the circumference direction. In the event of a fixed or continuous eccentricity of the rotor, however, the effectiveness of the compensation is limited.

In higher-poled motors, it is more favorable to dispose the teeth in antiphase by a double pole line, as the second embodiment demonstrates.

The influence of the rotor eccentricity is canceled out in these motors.

For the effectiveness of the compensation of the torque, the advantageous provision should be made that the depth of the teeth and the tooth spaces should be greater than or equal to the air gap width between the stator and the rotor.

The invention will be explained in detail in conjunction with exemplary embodiments depicted in the drawings.

The design of a motor with eight magnet poles P1 to P8 on the electrically commutated stator St and eight permanent magnet poles M1 to M8 on the rotor R, respectively, is explained in conjunction with FIGS. 1 to 4, wherein the figures respectively show one rotation direction of the rotor R, which is embodied as a sleeve-shaped external rotor.

Figure 3:
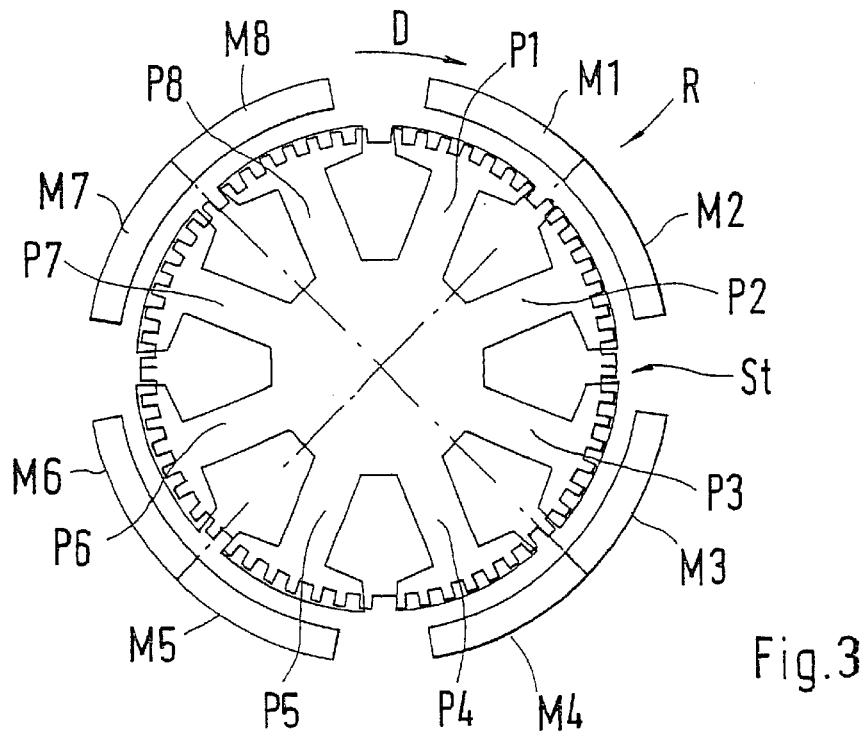
Figure 4:
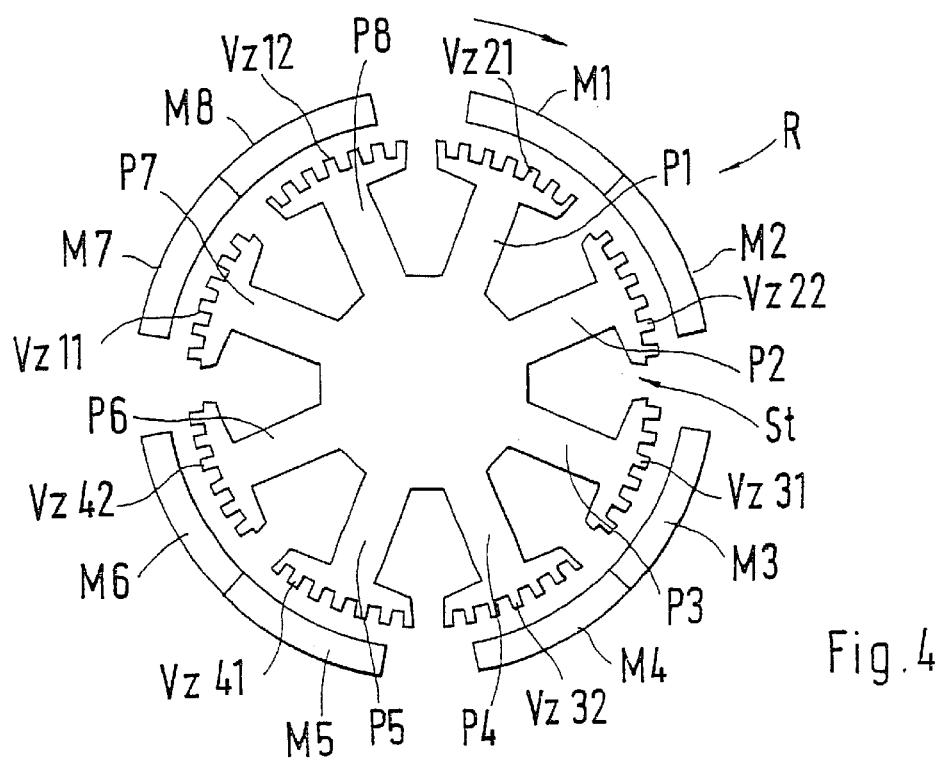

With this motor design, the axes A1 to A4 form four 90° segments each of which is to accommodate two respective permanent magnet poles M1 and M2, M3 and M4, M5 and M6, and M7 and M8 of the rotor R and two respective magnet poles P1 and P2, P3 and P4, P5 and P6, and P7 and P8, as shown in FIGS. 3 and 4. Since the formation of pole pairs should extend over pole pairs of the stator St which are respectively offset by two pole spacings, according to the invention, the magnet poles P1 and P3, P2 and P4, P5 and P7, and P6 and P8 must be provided with teeth which are respectively offset to one another in order to achieve a compensation of the torque.

FIGS. 1 to 4 show an exemplary embodiment in which the fine gearing teeth always extend over the entire air gap surface of the magnet poles P1 to P8 and are embodied with identical and uniform tooth spacing. This means that the width of the teeth St and the tooth spaces of the stator are the same size.

Figure 1:
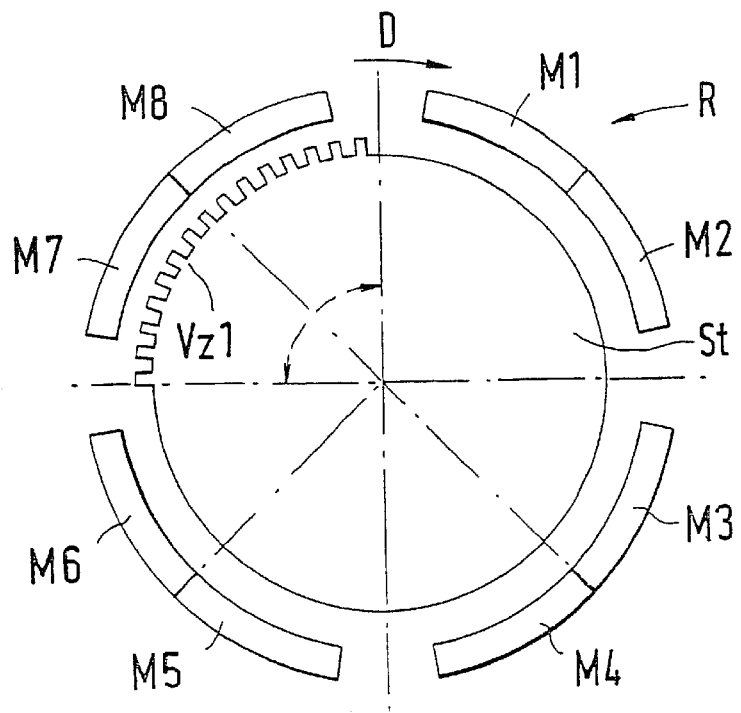
FIGS. 1 to 4 show the design, in stages, of the stator for a given 8-pole permanent magnet rotor.

In order to achieve the design of the motor outlined in FIG. 4, for example the 90° segment, which is oriented toward the permanent magnet poles M7 and M8, is provided with a fine gearing Vz1, as shown in FIG. 1, wherein the leading edge of a tooth is aligned with the axis A1. The fine gearing Vz3 which is associated with the permanent magnet poles M3 and M4, is correspondingly designed, as shown by the leading edge of a tooth that is aligned with the axis A3.

Figure 2:
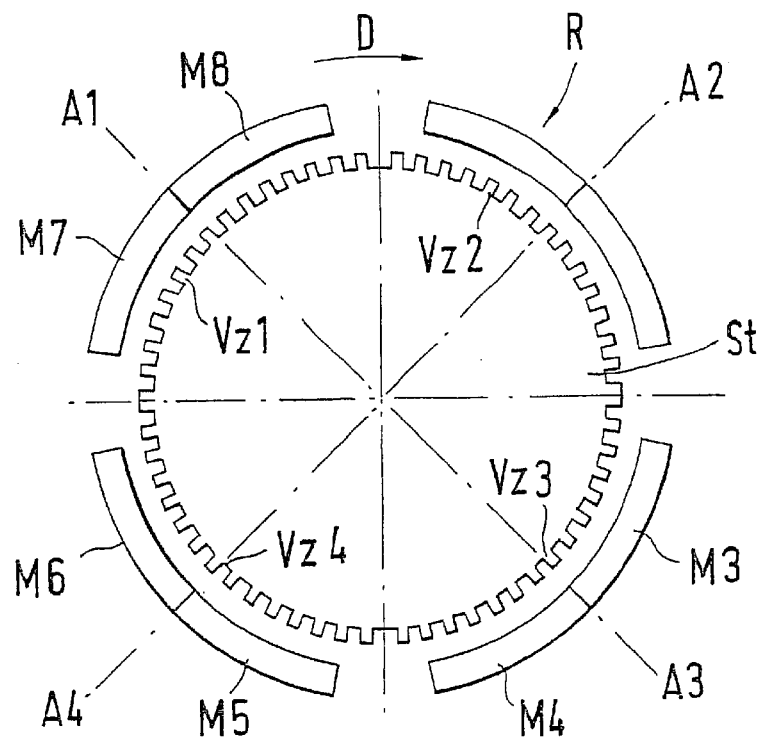

The 90° segments that are associated with the permanent magnet poles M1 and M2 as well as M5 and M6 have fine gearings Vz2 and Vz4, which are offset by half a tooth spacing in relation to the axes A2 and A4. If the teeth Z and the tooth spaces ZL have a uniform width a, then the offset is equal to a, i.e. the fine gearings Vz2 and Vz4 are disposed so that a leading edge is aligned with the axes A2 and A4, as can be seen in FIG. 2. The offset a therefore occurs in the pole pairs P1 and P3, P2 and P4, P5 and P7, and P6 and P8. The pole formation therefore is achieved via magnet poles which are offset by two pole spacings of the stator St. This produces alternating wide teeth and wide tooth spaces at the adjoining points between the 90° segments.

If the solid stator according to FIG. 3 is punched out, then the magnet poles P1 to P8 according to FIG. 4 are produced, wherein the fine gearings Vz1, Vz2, Vz3, and Vz4 are divided into two identical (partial) fine gearings Vz11 and Vz12, Vz21 and Vz22, Vz31 and Vz32, and Vz41 and Vz42, wherein the offset a between the fine gearings Vz11 and Vz21, Vz12 and Vz22, Vz31 and Vz41, and Vz32 and Vz42 is retained and contributes to the compensation of the detent moment over the entire circumference.

In the exemplary embodiment, the permanent magnet poles M1 to M8 are constituted by two-pole annular segment permanent magnets which are aligned with their neutral center axes on the axis A1 to A4 and are aligned with their poles in the same direction toward the circumference so that different poles of the annular segment permanent magnets respectively adjoin one another in the pole spaces of the rotor R. The rotor can also be constructed with multi-pole (>2) annular segment permanent magnets.

In the exemplary embodiment, the stator St and rotor R have the same number of ç=8 poles. The number of poles can also be less or more, it merely has to be an even number. The number of poles of the stator St can also differ from the number of poles of the rotor R. The permanent magnet poles M1 to M8 of the rotor R can also be constituted by individual permanent magnets that are magnetized in single-pole fashion.

Figure 5:
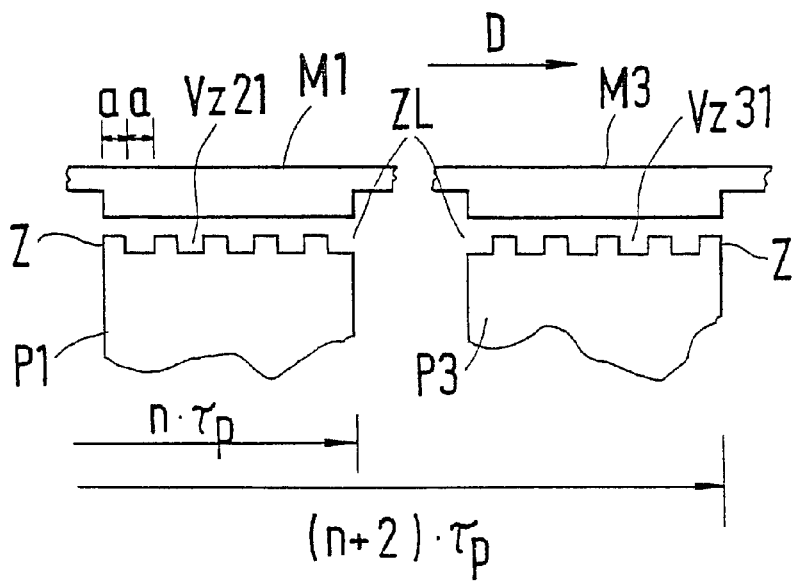
FIG. 5 shows the formation of pole pairs from diametrically opposed magnet poles.

For the motor embodied according to FIG. 4, FIG. 5 once again shows the offset a between the fine gearings Vz21 and Vz31 of the magnet poles P1 and P3, which are shown in a view with reference to the permanent magnet poles M1 and M3. If the permanent magnet poles M1 and M3 are embodied as individual permanent magnets, then a leading edge of a tooth Z of the fine gearing Vz31 is aligned with the trailing edge of the permanent magnet pole M3 and a leading edge of a tooth space ZL of the gearing Vz21 is aligned with the trailing edge of the permanent magnet pole M1 and the fine gearings Vz21 and Vz31 coincide with one another via the pole widths of the magnet poles P1 and P3 and of the permanent magnet poles M1 and M3.

The magnet poles P1 and P3 are disposed at a distance $(n+2)$ T, where $n = 1$ or 2 and T is the pole spacing.

The fine gearing teeth, however, can also extend over only a partial circumference region of the magnet poles P1 to P8. In this connection, the partial circumference regions of the pole pairs are as a rule matched to one another, i.e. they are selected so as to be equivalent to the magnet poles of the pole pairs.

The tooth spacing with uniformly embodied teeth Z and tooth spaces is also not absolutely necessary. In order to increase the compensation possibilities, it is possible to offset only a part of the teeth and tooth spaces from one another. Furthermore, the width of the teeth and the tooth spaces in the fine gearings can vary, at least in part. In this connection, it can be advantageous if the teeth Z of the fine gearing of the one magnet pole are supplementary to the tooth spaces ZL of the fine gearing of the other magnet pole of the pole pairs. It is clear from this that there are numerous possibilities for influencing the torque, which can be carried out solely by means of the stamping process of the stator St indicated in FIG. 3. In this connection, the symmetrical basic design of the stator St is essentially retained. The only thing that changes is the fine gearing on the air gap surfaces of the magnet poles P1 to P8.

Figure 6:
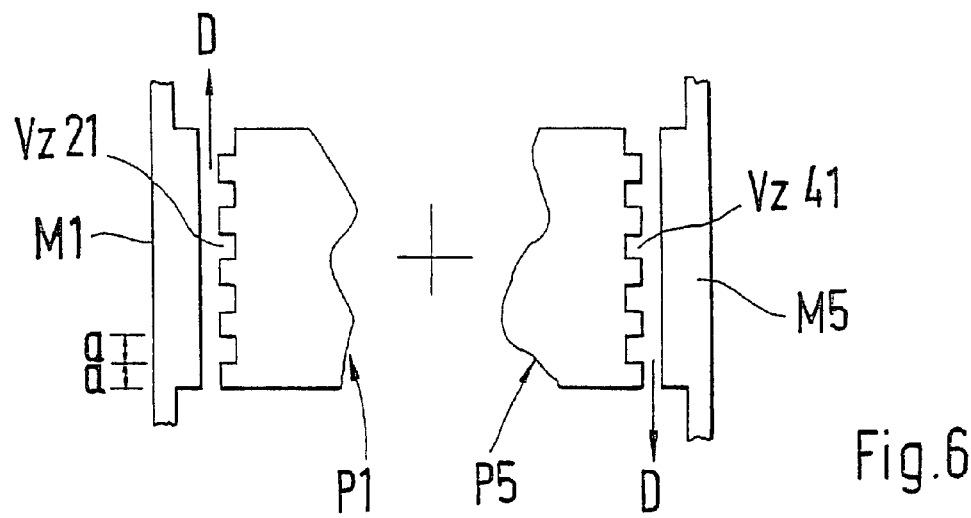
FIG. 6 shows the formation of pole pairs from magnet poles that are offset by two pole lines.

As shown by FIG. 6, the pole pair formation on the stator St can also be carried out by means of diametrically opposed pole pairs, as represented by the magnet poles P1 and P5. The fine gearings Vz21 and Vz41 in this connection are offset from each other by half a tooth spacing, as can be seen from their leading edges in relation to the trailing edges of the permanent magnet poles M1 and M5.

The pole pair formation can also be carried out by means of adjacent magnet poles, i.e. magnet poles that are offset by one pole spacing, e.g. P1 and P2 through P7 and P8. In addition, the pole pair formation can be realized solely by means of the stamping process of the stator St shown in FIG. 3. The number of the teeth of the fine gearings is preferably greater than the number of the poles of the stator St and the depths of the teeth Z and the tooth spaces ZL in the radial direction is greater than or equal to the air gap width.

In any case, the design of the motor remains simple and can be easily achieved. There are numerous possibilities of varying effectiveness for the compensation of the detent moment. In each instance, a uniform, low-noise operation of the motor is achieved.

The foregoing relates to a preferred exemplary embodiment of the invention, it being understood that other variants and embodiments thereof are possible within the spirit and scope of the invention, the latter being defined by the appended claims.

We claim:

1. A motor with a stator (St) that has a number of magnet poles (P1 to P8) and a rotor (R) with a corresponding number of permanent magnet poles (M1 to M8), in which an air gap is formed in the region between the stator (St) and rotor (R), the stator is provided with gearing teeth in order to reduce a torque between the stator and rotor, wherein the pole structure of the stator (St) and rotor (R) is designed to be essentially symmetrical in a circumferential direction and the magnet poles (P1 to P8) of the stator (St) are provided at least over a partial region of the air gap with the gearing teeth, and wherein the magnet poles (P1 to P8) of the stator (St) constitute pole pairs in which the gearing teeth are disposed offset from one another at least in partial circumferential regions.

2. The motor according to claim 1 wherein the number of the magnet poles (P1 to P8) of the stator (St) is matched to the number of the permanent magnet poles (M1; M8) of the rotor (R).

3. The motor according to claim 2, wherein the offset of the gearing teeth of the pole pairs preferably correspond to half a spacing of the gearing teeth.

4. The motor according to claim 2 wherein the permanent magnet poles (M1 to M8) of the rotor (R) are constituted by individual permanent magnets distributed uniformly over the circumference of the rotor (R), which have an alternating polarity in the circumferential direction.

5. The motor according to claim 2, wherein the permanent magnet poles (M1 to M8) of the rotor (R) are constituted by a number of two-pole annular segment permanent magnets distributed uniformly over a circumference of the rotor (R), which are disposed with their poles in a same direction toward the circumference.

6. The motor according to claim 1, wherein the offset of the gearing teeth of the pole pairs preferably correspond to half a spacing of the gearing teeth.

7. The motor according to claim 1, wherein the stator (St) is embodied as an internal stator and the rotor (R) is embodied as an external rotor.

8. The motor according to claim 1 wherein the permanent magnet poles (M1 to M8) of the rotor (R) are constituted by individual permanent magnets distributed uniformly over the circumference of the rotor (R), which have an alternating polarity in the circumferential direction.

9. The motor according to claim 8, wherein the individual permanent magnets are magnetized in a single-pole manner.

10. The motor according to claim 1, wherein the permanent magnet poles (M1 to M8) of the rotor (R) are constituted by a number of two-pole annular segment permanent magnets distributed uniformly over a circumference of the rotor (R), which are disposed with their poles in a same direction toward the circumference.

11. The motor according to claim 10, wherein the permanent magnet poles (M1 to M8) of the rotor (R) are constituted by multi-pole annular segment permanent magnets.

12. The motor according to claim 1, wherein the gearing teeth are embodied as meander-shaped.

13. The motor according to claim 12, wherein the teeth (Z) and the spaces (ZL) of the gearing teeth have identical widths and identical depths.

14. The motor according to claim 12, wherein the teeth (Z) and spaces (ZL) of the one pole change in the same manner at least in a partial circumference region.

15. The motor according to claim 12, wherein the teeth (Z) and the spaces (ZL) of the gearing teeth have different widths but have identical depths and are supplementary to each other in the pole pairs.

16. The motor according to claim 12, wherein the teeth (Z) and spaces (ZL) of the one pole change in the same manner at least in a partial circumference region.

17. The motor according to claim 1, wherein the number of the teeth (Z) and tooth spaces (ZL) of the gearing teeth is an integral multiple of the number of the pole pairs formed.

18. The motor according to claim 1, wherein the gearing teeth of said pole pairs of the stator (St), which are formed of respectively adjacent or diametrically opposed magnet poles, are offset in relation to one another.

19. The motor according to claim 1, wherein the gearing teeth of said pole pairs of the stator (St), which are formed of magnet poles respectively offset by two pole spacings, are offset in relation to one another.

20. The motor according to claim 1, wherein the depths of the teeth (Z) and the tooth spaces (ZL) are greater than or approximately equal to the air gap width between the stator (St) and the rotor (R).

* * * * *

UNITED STATES PATENT AND TRADEMARK OFFICE
CERTIFICATE OF CORRECTION

PATENT NO.    : 6,380,646 B1
DATED         : April 30, 2002
INVENTOR(S)   : Christof Bernauer et al.

It is certified that error appears in the above-identified patent and that said Letters Patent is hereby corrected as shown below:

<u>Title page,</u>
Item [73], should read as follows:

-- [73] Robert Bosch GmbH --

Signed and Sealed this

Third Day of September, 2002

Attest:

Attesting Officer

JAMES E. ROGAN
*Director of the United States Patent and Trademark Office*